United States Patent Office 3,168,581
Patented Feb. 2, 1965

3,168,581
PRODUCTION OF CYCLIC DIENES
Roy L. Pruett, Charleston, W. Va., assignor to Union
Carbide Corporation, a corporation of New York
No Drawing. Filed Aug. 21, 1962, Ser. No. 218,439
7 Claims. (Cl. 260—666)

This invention relates to a process for the production of a cyclic diene by the dimerization of a conjugated diene. More particularly, this invention relates to a process for the dimerization of a conjugated alkadiene in the presence of a (cyclopentadienyl)manganese(polyphenyl) compound.

It has already been proposed to dimerize a conjugated diene to cyclic olefinic compounds containing at least eight carbon atoms in the ring. The thermal non-catalyzed dimerization of 1,3-butadiene yields almost exclusively 4-vinylcyclohexene with only small amounts of cyclooctadiene-1,5 being formed. Selective dimerization of a conjugated diene in the presence of various catalysts to produce substantial amounts of a cyclooctadiene has been proposed; however, processes utilizing such catalysts suffer from one or more disadvantages, such as high catalyst toxicity, lengthy reaction periods, formation of appreciable quantities of cyclododecatriene and higher polymers, and the like.

Accordingly, one or more of the following objects will be achieved by the practice of this invention.

It is an object of the invention to provide a novel process for the selective dimerization of a conjugated diene to produce a cyclooctadiene. It is another object of the invention to provide a novel process for the selective dimerization of a conjugated diene which avoids one or more of the disadvantages of the prior art. Other objects will become apparent to those skilled in the art in light of the instant specification.

In a broad aspect, the present invention is directed to a process which comprises contacting a conjugated diene with a catalytic amount of a (cyclopentadienyl)manganese(polyphenyl) compound, at an elevated temperature, and for a period of time sufficient to dimerize said diene. A cyclooctadiene is one of the products of the selective dimerization of this invention.

The conjugated dienes which can be employed as reactants in the novel process are characterized by the presence therein of a

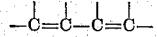

unit and preferably contain 12 carbon atoms or less. Illustrative dienes are, for example, the conjugated alkadienes, such as 1,3-butadiene, isoprene, 1,3-pentadiene, 2,3-dimethyl-1,3-butadiene, 1,3-hexadiene 2,4-octadiene, 2-methylpentadiene-1,3, and the like; and the alkoxy-substituted conjugated alkadienes, such as 2-methoxybutadiene-1,3, 2,3-dimethoxybutadiene-1,3, 2-methoxy-3-ethoxypentadiene-1,3, and the like. The conjugated alkadienes which contain from 4 to 8 carbon atoms are highly preferred.

The (cyclopentadienyl)manganese(polyphenyl) compounds suitable as catalysts in the novel process of the invention are organomanganese compounds wherein the metal atom is bonded to one cyclopentadienyl group and to one aromatic group. These compounds can be represented by the general formula:

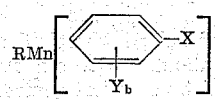

wherein R is cyclopentadienyl or alkylcyclopentadienyl; wherein X is phenyl or alkylphenyl; wherein Y is alkyl, phenyl, alkylphenyl, or phenylalkyl; and wherein b is an integer having a value from 0 to 4. The polyphenyl portion, which is enclosed in parentheses in the above formula, thus includes, for example, diphenyl, terphenyl, and their alkyl derivatives. The alkyl radical of the above variables preferably contains from 1 to 4 carbon atoms.

Illustrative organomanganese compounds include (cyclopentadienyl)manganese(diphenyl),
(methylcyclopentadienyl)manganese(diphenyl),
(ethylcyclopentadienyl)manganese(diphenyl),
(dimethylcyclopentadienyl)manganese(diphenyl),
(butylcyclopentadienyl)manganese(diphenyl),
(cyclopentadienyl)manganese(terphenyl),
(cyclopentadienyl)manganese(p,p'-dimethyldiphenyl),
(cyclopentadienyl)manganese(p-ethyldiphenyl),
(methylcyclopentadienyl)manganese(p,p'-diethyldiphenyl), and (cyclopentadienyl)manganese(tetraethyldiphenyl).

In general, the organomanganese compounds are prepared by reacting an alkali metal with an equimolar amount of an arene hydrocarbon having the formula:

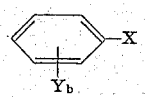

wherein X, Y, and b have the meanings defined supra, at a temperature of about −10° C. to about 25° C. in an inert liquid organic medium, e.g., ethylene glycol dimethyl ether, and thereafter reacting the alkali metal complex product with a cyclopentadienyl manganese halide under substantially similar reaction conditions. The (cyclopentadienyl)manganese(polyphenyl) compound is recovered from the reaction product mixture by evaporation of the inert liquid medium under reduced pressure and extraction of the residue with a suitable solvent, i.e., n-heptane.

The organomanganese product can be recovered as a residue by evaporation of the solvent medium.

The organomanganese compounds are employed in the novel process in catalytically significant quantities. In general, a catalyst concentration in the range of from about 0.1, or lower, to about 25, or higher, weight percent, based on the weight of the diene, is suitable. A catalyst concentration in the range of from about 1 to about 10 weight percent is preferred. A catalyst concentration in the range of from about 2 to about 5 percent is highly preferred. For optimum results, the particular catalyst and dienic reactant employed, the operative conditions under which the dimerization reaction is conducted, and other factors will largely determine the desired catalyst concentration.

The dimerization reaction preferably occurs in the liquid phase, and to this extent sufficient pressure is employed to maintain an essentially liquid reaction mixture regardless whether or not an inert normally-liquid vehicle is employed. In general, pressures in the range of from about 1 to about 100 atmospheres, or higher, can be employed. Preferably, the reaction is carried out under superatmospheric pressures, for example, of from about 6 to about 60 atmospheres.

Since the organomanganese compounds are substantially soluble in the liquid dienic reactant, they usually form a homogeneous phase with the reaction medium under the operative conditions of the process. If necessary, a solvent which is inert with respect to the reactants and products may be employed to bring about the required homogeneity. Illustrative of the inert normally-liquid organic solvents are the aromatic hydrocarbons, e.g., benzene, toluene, and the like; and the saturated aliphatic hydrocarbons, e.g., hexane, heptane, and the like.

The dimerization reaction can be conducted over a wide temperature range. Depending upon various factors such as the particular catalyst and dienic reactant employed, the concentration of the catalyst, and the like, the reaction temperature may be as low as 50° C., and lower, and as high as 200° C., and higher. A reaction temperature in the range of from about 75° C. to about 125° C. is preferred.

In general, the reaction is conducted for a period of time sufficient to dimerize the dienic reactant and such time will vary depending on the operative temperature, the particular catalyst and the concentration employed, and other factors. It has been observed that desirable results may be obtained by conducting the reaction for a period of time ranging from about 1 to about 10 hours. At reaction temperatures of 150° C. to 180° C., a reaction period of about 2 to about 3 hours will result in substantially complete dimerization, while at reaction temperatures of 90° C. to 120° C. a reaction period of up to 7 hours, or higher, may be desirable.

The novel process can be executed in a batch, semicontinuous, or continuous fashion. The reaction vessel can be a glass vessel, steel autoclave, elongated metallic tube, or other equipment and material employed in the art provided that such equipment is able to withstand the reaction pressures and that the catalyst employed is not sensitive to this material of construction. The order of addition of the catalyst and dienic reactant does not appear to be critical. A suitable procedure is to dissolve the desired amount of catalyst in the liquid dienic reactant and to introduce the resulting diene-catalyst solution into the reaction zone under nitrogen and in the absence of light.

The 1,5-cyclooctadienic product can be recovered from the resulting reaction product mixture by conventional techniques such as flash distillation of said reaction product mixture under reduced pressures. The dimerization products which are obtained in accordance with the present invention are useful in the preparation of alcohols, ketones, acids, amines, epoxides, and various other derivatives. They can also be employed as a monomeric source in the preparation of useful polymers.

The following examples are illustrative.

*Example 1*

A diphenyl sodium complex was prepared in a flask under an argon atmosphere, by the reaction of 23.1 grams (0.15 mole) of diphenyl in 250 milliliters of ethylene glycol dimethyl ether with 6.0 grams of a 50% dispersion of sodium in toluene.

Sodium cyclopentadiene was prepared in a separate flask by stirring 6.9 grams of a 50 weight percent sodium dispersion in toluene (0.15 mole Na) in 250 milliliters of anhydrous ethylene glycol dimethyl ether and adding thereto 10.8 grams (0.17 mole) of cyclopentadiene. An argon atmosphere was maintained throughout. The temperature of the reaction mixture was held below 40° C. during the addition. White crytsals of sodium cyclopentadiene were formed.

In a third flask, a milk-white suspension of manganous chloride in ethylene glycol dimethyl ether was prepared by stirring 18.9 grams (0.13 mole) of finely divided anhydrous manganous chloride in 250 milliliters of ethylene glycol dimethyl ether at room temperature for one hour. The sodium cyclopentadiene was then added to the manganous chloride at room temperature with stirring. After about 15 minutes the reaction mixture containing cyclopentadienyl manganese chloride was cooled to about —20° C. and the diphenyl sodium complex added slowly over a period of about 15 minutes. The reaction mixture was maintained below —10° C. for one hour, allowed to warm to room temperature, and then filtered. The red-brown filtrate was evaporated to dryness under reduced pressure. The residue, when leached with n-heptane, gave a bright red-orange solution The n-heptane solution was evaporated to dryness to yield red-orange crystals which were purified by fractional sublimation. Red crystals of (cyclopentadienyl)manganese(diphenyl) were obtained. (Cyclopentadienyl) manganese(diphenyl) is a red solid, M.P. 73°–75° C., which distills at 80°–90° C. under a pressure of 0.04 mm. of Hg. It is stable to air in heptane in the absence of light, but slowly decomposes in the presence of light.

*Example 2*

(A) To a heavy-walled glass tube there were charged 3 milliliters of n-heptane, 0.5 gram of (cyclopentadienyl) manganese(diphenyl) and 6 milliliters of liquid 1,3-butadiene at a temperature of about —78°C. The tube and contents were cooled in liquid nitrogen. Air was evacuated from the tube, and the tube was sealed, and heated to a temperature of about 140° C. for a period of about 2 hours. After this period of time the temperature was raised to about 150° C. and maintained thereat for an additional 7 hours. Thereafter, the tube and contents were cooled to room temperature, i.e., about 24° C., and the tube was opened. The resulting liquid product mixture was subjected to distillation under reduced pressure at a temperature below about 70° C. Vapor phase chromatography revealed that the distillate contained about 67 weight percent 4-vinylcyclohexene and about 33 weight percent cyclooctadiene-1,5.

(B) In an analogous manner as above, when isoprene is contacted with (methylcyclopentadienyl)manganese(diphenyl), there is obtained a reaction product mixture which contains substantial amounts of 1,5-dimethylcyclooctadiene-1,5 and 1,6-dimethylcyclooctadiene-1,5.

*Example 3*

(A) To a heavy-walled glass tube there were charged 1.5 grams of (cyclopentadienyl)manganese(diphenyl) and 10 milliliters of 1,3-butadiene at a temperature of about —78° C. The tube and contents were cooled in liquid nitrogen. Air was evacuated from the tube, and the tube was sealed, and heated to a temperature of about 110° C. for a period of about 6 hours. After this period of time the tube and contents were cooled to room temperature, i.e., about 24° C., and the tube was opened. The resulting liquid reaction product mixture was subjected to distillation under reduced pressure at a temperature below 70° C. Vapor phase chromatography revealed that the distillate contained about 89 weight percent cyclooctadiene-1,5 and about 11 weight percent 4-vinylcyclohexene.

(B) In an analogous manner as above, when 1,3-pentadiene is contacted with (cyclopentadienyl)manganese (terphenyl), there is obtained a reaction product mixture which contains substantial amounts of 3,4-dimethylcyclooctadiene-1,5 and 3,7-dimethylcyclooctadiene-1,5.

Although the invention has been illustrated by the preceding examples, the invention is not to be construed as limited by the materials employed in the above examples, but rather the invention encompasses the generic area as hereinbefore disclosed. Various modifications and embodiments of this invention can be made without departing from the spirit and scope thereof.

What is claimed is:

1. A process which comprises contacting a conjugated diene with a catalytic amount of a (cyclopentadienyl) manganese(polyphenyl) compound, at an elevated temperature, and for a period of time sufficient to dimerize said diene.

2. The process of claim 1 wherein the temperature is in the range of from about 50° C. to about 200° C.

3. A process which comprises contacting a conjugated alkadiene containing from 4 to 12 carbon atoms with from about 0.1 to about 25 weight percent, based on the weight of said alkadiene, of a (cyclopentadienyl)manganese (polyphenyl) compound characterized by the following formula:

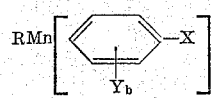

wherein R is selected from the group consisting of cyclopentadienyl and alkylcyclopentadienyl; wherein X is selected from the group consisting of phenyl and alkylphenyl; wherein Y is selected from the group consisting of alkyl, phenyl, alkylphenyl, and phenylalkyl; and wherein $b$ is an integer having a value of from zero to 4; at a temperature in the range of from about 50° C. to about 200° C.; and for a period of time sufficient to dimerize said alkadiene.

4. The process of claim 3 wherein the temperature is in the range of from about 75° C. to about 125° C.

5. A process which comprises contacting in the liquid phase a conjugated alkadiene containing from 4 to 12 carbon atoms with from about 1 to about 10 weight percent, based on the weight of the alkadiene, of (cyclopentadienyl)manganese(biphenyl); at a temperature of from about 50° C. to about 200° C.; and for a period of time sufficient to produce a cyclooctadienic product.

6. A process which comprises contacting in the liquid phase 1,3-butadiene with from about 1 to about 10 weight percent, based on the weight of said butadiene, of (cyclopentadienyl)manganese(biphenyl); at a temperature of from about 50° C. to about 200° C.; and for a period of time sufficient to produce cyclooctadiene-1,5.

7. The process of claim 6 wherein the temperature is in the range of from about 75° C. to about 125° C.

No references cited.